US009803062B2

(12) United States Patent
Hasegawa et al.

(10) Patent No.: US 9,803,062 B2
(45) Date of Patent: Oct. 31, 2017

(54) HEAT RESISTANT SILICONE RUBBER COMPOSITION

(71) Applicant: DOW CORNING TORAY CO., LTD., Tokyo (JP)

(72) Inventors: Chiichiro Hasegawa, Fukui (JP); Masakazu Irie, Chiba (JP); Naoya Ishigami, Chiba (JP)

(73) Assignee: DOW CORNING TORAY CO., LTD., Tokyo (JP)

( * ) Notice: Subject to any disclaimer, the term of this patent is extended or adjusted under 35 U.S.C. 154(b) by 0 days.

(21) Appl. No.: 14/891,590

(22) PCT Filed: May 23, 2014

(86) PCT No.: PCT/JP2014/064355

§ 371 (c)(1),
(2) Date: Nov. 16, 2015

(87) PCT Pub. No.: WO2014/189153

PCT Pub. Date: Nov. 27, 2014

(65) Prior Publication Data

US 2016/0090465 A1 Mar. 31, 2016

(30) Foreign Application Priority Data

May 23, 2013 (JP) ................................ 2013-108996

(51) Int. Cl.
*C08K 3/22* (2006.01)
*C08L 83/04* (2006.01)

(52) U.S. Cl.
CPC ................ *C08K 3/22* (2013.01); *C08L 83/04* (2013.01); *C08K 2003/2241* (2013.01); *C08K 2003/2265* (2013.01); *C08K 2201/014* (2013.01)

(58) Field of Classification Search
None
See application file for complete search history.

(56) References Cited

U.S. PATENT DOCUMENTS 2,710,289 A 6/1955 Smith-Johannsen
4,102,852 A * 7/1978 DeLaTorre ........... C08K 5/0091 260/DIG. 24
4,110,300 A 8/1978 Matsushita
5,830,405 A 11/1998 Mazeika et al.

FOREIGN PATENT DOCUMENTS

JP H01-108258 A 4/1989
JP H09-502299 A 3/1997
JP H11-158382 A 6/1999
JP 2003-331653 A 11/2003
JP 2009-274015 A 11/2009

OTHER PUBLICATIONS

Wypych, George. Handbook of Fillers, 2nd Edition. Toronto, ChemTec Publishing, 2000, p. 154. TP1114.W96.*
PCT/JP2014/064355 International Search Report dated Aug. 4, 2014, 4 pages.
English language abstract for JPH01-108258A extracted from https://www4.j-platpat.inpit.go.jp database on Oct. 30, 2015, 2 pages.
English language abstract and machine assisted English translation for JPH11-158382A extracted from https://www4.j-platpat.inpit.go.jp database on Oct. 30, 2015, 12 pages.
English language abstract and machine assisted English translation for JP2003-331653A extracted from https://www4.j-platpat.inpit.go.jp database on Oct. 30, 2015, 12 pages.
English language abstract and machine assisted English translation for JP2009-274015A extracted from https://www4.j-platpat.inpit.go.jp database on Oct. 30, 2015, 14 pages.
English language abstract for JPH09-502299A extracted from http://www.worldwide.espace.net.com database on Nov. 2, 2015, 1 page and machine assisted English translation for JPH09-502299A extracted from https://www4.j-platpat.inpit.go.jp database on Oct. 30, 2015, 12 pages.

* cited by examiner

*Primary Examiner* — Vickey Nerangis
(74) *Attorney, Agent, or Firm* — Warner Norcross & Judd LLP

(57) ABSTRACT

A heat resistant silicone rubber composition containing greater than or equal to 0.1 mass % each of titanium oxide and iron oxide is disclosed. The heat resistant silicone rubber composition can form a heat resistant silicone rubber suitable for use in a high temperature environment. A method of reducing formaldehyde and/or low molecular weight organopolysiloxane generated from a cured product of a heat resistant silicone rubber composition upon heating the cured product is also disclosed. The method comprises compounding greater than or equal to 0.1 mass % each of titanium oxide and iron oxide in the heat resistant silicone rubber composition. Generally, even when the cured product is heated to a high temperature, such as a temperature greater than or equal to 300° C., generation of formaldehyde and/or low molecular weight organopolysiloxane (e.g. D4, D5, and D6) from the cured product can be reduced.

17 Claims, No Drawings

HEAT RESISTANT SILICONE RUBBER COMPOSITION

CROSS-REFERENCE TO RELATED APPLICATIONS

This application is the National Stage of International Application No. PCT/JP2014/064355 filed on 23 May 2014, which claims priority to and all advantages of Japanese Patent Application No. 2013-108996 filed on 23 May 2013, the content of which is hereby incorporated by reference.

TECHNICAL FIELD

The present invention relates to a silicone rubber composition that forms a heat resistant silicone rubber suitably usable in a high temperature environment.

BACKGROUND ART

Silicone rubber products are used in various high temperature environments due to their excellent heat resistance. In recent years, silicone rubber products are used in microwave ovens, inside of heating furnaces, engine compartments of automobiles, and the like, in which a high heat resistance in higher temperature environments, such as in a temperature exceeding 200° C. for example, is required. In light of such circumstances, to further enhance the heat resistance of silicone rubber, it has been widely known to compound a small quantity of titanium oxide, cerium oxide, cerium hydroxide, or carbon black as a heat resisting material.

For example, Japanese Unexamined Patent Application Publication No. H11-158382A describes a silicone rubber composition, containing anatase type titanium oxide fine powder, used as a sealing/packing material for various food containers that are required to have high heat resistance.

Furthermore, Japanese Unexamined Patent Application Publication No. 2003-331653A describes a silicone rubber composition containing a solid solution of iron oxide and titanium oxide. However, this silicone rubber composition is for a rubber stress cone used in cables. Therefore, only the fact that the silicone rubber composition is characterized by having good weatherability is expressly mentioned, and this silicone rubber composition is not designated for applications that require high heat resistance. Furthermore, Japanese Unexamined Patent Application Publication (Translation of PCT Application) No. H09-502299A also describes a silicone rubber composition containing iron oxide and titanium oxide; however, this composition is also for the purpose of using as an insulator, only the fact that the composition has a high flashover resistance and arc-resistance is expressly mentioned, and this composition is also not designated for applications that require high heat resistance.

PRIOR ART DOCUMENTS

Patent Documents

Patent Document 1: Japanese Unexamined Patent Application Publication No H11-158382A Patent Document 2: Japanese Unexamined Patent Application Publication No. 2003-331653A Patent Document 3: Japanese Unexamined Patent Application Publication (Translation of PCT Application) No. H09-502299A

SUMMARY OF INVENTION

Technical Problem

The present inventors discovered the fact that, when a cured product of a silicone rubber composition containing a conventional heat resistant agent is exposed to a high temperature, the silicone rubber generates a gas containing a large amount of formaldehyde and/or low molecular weight organosiloxane. Since these can pollute the surrounding environment, and also since formaldehyde can be harmful to the human body, generation of formaldehyde and/or low molecular weight organopolysiloxane from the cured product is a big problem.

Therefore, an object of the present invention is to provide a heat resistant silicone rubber composition, by which a silicone rubber for applications that require heat resistance can be obtained, that does not have such demerits.

Solution to Problem

As a result of diligent research, the present inventors discovered that the above object can be achieved by compounding greater than or equal to 0.1 mass % each of titanium oxide and iron oxide in a silicone rubber composition. In addition, the present inventors also discovered that low compression set can be achieved by a cured product of a heat resistant silicone rubber composition containing greater than or equal to 0.1 mass % each of titanium oxide and iron oxide.

Therefore, the present invention is a heat resistant silicone rubber composition containing greater than or equal to 0.1 mass % each of titanium oxide and iron oxide.

The BET specific surface area of titanium oxide is preferably greater than or equal to 10 $m^2/g$.

The iron oxide is preferably diiron trioxide, that is, $Fe_2O_3$.

The heat resistant silicone rubber composition of the present invention can be any publicly known curing type such as peroxide curing type, hydrosilylation (addition reaction) curing type, condensation reaction curing type, or ultraviolet radiation-curing type. The heat resistant silicone rubber composition is preferably a peroxide curing type or hydrosilylation (addition reaction) curing type.

The present invention also relates to a method of reducing formaldehyde and/or low molecular weight organopolysiloxane generated from a cured product of a silicone rubber composition upon heating the cured product, the method comprising compounding greater than or equal to 0.1 mass % each of titanium oxide and iron oxide in the composition.

In addition, the present invention also relates to a use of greater than or equal to 0.1 mass % each of titanium oxide and iron oxide in a silicone rubber composition for reducing formaldehyde and/or low molecular weight organopolysiloxane generated from a cured product of the composition upon heating the cured product.

Advantageous Effects of Invention

The cured product obtained by curing the heat resistant silicone rubber composition of the present invention generates a gas in which content of formaldehyde and/or low molecular weight organopolysiloxane is low, even when exposed to high temperatures. Therefore, the present invention is suitable for use as cookware used under extremely high temperature conditions, or alternatively as an adhesive, a sealing, or the like in a high temperature part such as a heating furnace, an engine compartment of an automobile, or the like.

The cured product of the heat resistant silicone rubber composition of the present invention has a high capability of recovering even after compressing for a long time due to its low compression set.

DETAILED DESCRIPTION OF THE INVENTION

The first aspect of the present invention is a heat resistant silicone rubber composition characterized by having greater than or equal to 0.1 mass % each of titanium oxide and iron oxide relative to the total mass of the composition.

The "heat resistant silicone rubber composition" of the present invention means an uncured silicone rubber composition from which a silicone rubber for a highly heat resistant article that can be used in a high temperature environment that is more severe than usual, such as 200° C. or higher, preferably 250° C. or higher, more preferably 300° C. or higher, can be obtained by curing. Examples of applications that require high heat resistance include a heat cooking vessel, cookware such as a baking mold for confectioneries, a sealing/packing for microwave ovens, ovens, and the like, a sealing/packing for heating furnaces, a sealing/packing for engines of automobiles, aircraft, ships, and the like.

The cured product of the heat resistant silicone rubber composition of the present invention has a characteristic that a gas generated therefrom has a low content of formaldehyde and/or low molecular weight organopolysiloxane even when exposed to a severe condition such as 300° C. or higher. In addition, the cured product also has a characteristic that the compression set is low.

The heat resistant silicone rubber composition of the present invention can be any publicly known curing type such as peroxide curing type, hydrosilylation (addition reaction) curing type, condensation reaction curing type, or ultraviolet radiation-curing type.

In the case of peroxide curing type, the heat resistant silicone rubber composition of the present invention typically contains:

(A) organopolysiloxane raw rubber; and (B) organic peroxide.

The cured product thereof can be obtained by, for example, heat curing the composition.

The component (A) is a main agent of this composition, and it is possible to use a compound termed an organopolysiloxane raw rubber as this main agent. This type of organopolysiloxane raw rubber preferably has a viscosity of greater than or equal to 1,000,000 mPa·s, and more preferably greater than or equal to 5,000,000 mPa·s at 25° C. Furthermore, the behavior of this type of component (A) is raw rubber-like. The Williams plasticity number is preferably greater than or equal to 50, and more preferably is greater than or equal to 100. Furthermore, the degree of polymerization is typically from 1,000 to 20,000, and the weight average molecular weight is typically greater than or equal to $20\times10^4$.

The organopolysiloxane raw rubber is exemplified by an organopolysiloxane represented by the average unit formula (1) below:

$$R^1SiO_{(4-a/2)} \quad (1)$$

(in the formula, R1 is a monovalent hydrocarbon group; and a is a number from 1.8 to 2.3).

The monovalent hydrocarbon group is preferably a substituted or unsubstituted straight or branched monovalent hydrocarbon group having from 1 to 30 carbons. Examples thereof include straight or branched alkyl groups having from 1 to 30 carbons such as a methyl group, an ethyl group, a propyl group, a butyl group, a pentyl group, a hexyl group, a heptyl group, and an octyl group; cycloalkyl groups having from 3 to 30 carbons such as a cyclopentyl group and a cyclohexyl group; alkenyl groups having from 2 to 30 carbons such as a vinyl group, an allyl group, and a butenyl group; aryl groups having from 6 to 30 carbons such as a phenyl group and a tolyl group; aralkyl groups having from 7 to 30 carbons such as a benzyl group and a phenethyl group; and groups wherein the hydrogen atoms bonded to the carbon atoms of the above groups are substituted at least partially by a halogen atom such as fluorine, or an organic group having a hydroxyl group, an epoxy group, a glycidyl group, an acyl group, a carboxyl group, an ester group, an amino group, an amide group, a (meth)acryl group, a hydroxyl group, a mercapto group, an isocyanate group, or the like (with the provision that the total number of carbons is from 1 to 30). A straight alkyl group having from 1 to 6 carbons or a phenyl group is preferable and a methyl group, an ethyl group, or a phenyl group is more preferable.

In a peroxide curing type heat resistant silicone rubber composition of the present invention, the component (A) is preferably an alkenyl group-containing organopolysiloxane raw rubber that has at least two alkenyl groups in a molecule. This is because good curing properties and physical properties are obtained even when an alkyl-type organic peroxide, such as 2,5-dimethyl-2,5-di-t-butylperoxy hexane or the like, is used as the curing agent.

The molecular structure of the component (A) may be any straight chain structure or branch-containing straight chain structure. This component may be a homopolymer, a copolymer, or a mixture of these polymers. Specific examples of the siloxane unit constituting this component include dimethylsiloxane units, methylsiloxane units, methylvinylsiloxane units, methylphenylsiloxane units, and methyl(3,3,3-trifluoropropyl)siloxane units. Examples of the groups present at the molecular terminals include a trimethylsiloxy group, a dimethylvinylsiloxy group, a methylvinylhydroxysiloxy group, and a dimethylhydroxysiloxy group. Examples of such organopolysiloxane raw rubbers include methylvinylpolysiloxane raw rubber capped at both molecular terminals with trimethylsiloxy groups, copolymer raw rubber of dimethylsiloxane and methylvinylsiloxane capped at both molecular terminals with trimethylsiloxy groups, dimethylpolysiloxane raw rubber capped at both molecular terminals with dimethylvinylsiloxy groups, copolymer raw rubber of dimethylsiloxane and methylsiloxane capped at both molecular terminals with dimethylvinylsiloxy groups, copolymer raw rubber of dimethylsiloxane and methylvinylsiloxane capped at both molecular terminals with dimethylvinylsiloxy groups, copolymer raw rubber of dimethylsiloxane and methylvinylsiloxane capped at both molecular terminals with dimethylhydroxysiloxy groups, copolymer raw rubber of dimethylsiloxane, methylvinylsiloxane, and methylphenylsiloxane capped at both molecular terminals with methylvinylhydroxysiloxy groups, and copolymer raw rubber of dimethylsiloxane, methylvinylsiloxane, and (3,3,3-trifluoropropyl)methylsiloxane capped at both molecular terminals with methylvinylhydroxysiloxy groups.

The component (B) is a curing agent, and it is possible to use a publicly known conventional organic peroxide that is known to be used as a curing agent for a heat resistant silicone rubber composition. Examples of such an organic peroxide include benzoyl peroxide, dicumyl peroxide, cumyl-t-butyl peroxide, 2,5-dimethyl-2,5-di-t-butylperoxy hexane, di-t-butyl peroxide, and bis(para-methylbenzoyl) peroxide. The compounded amount of the organic peroxide is preferably in a range of 0.05 to 15 parts by mass, and more preferably in a range of 0.1 to 5 parts by mass, relative to 100 parts by mass of the component (A).

In the case of hydrosilylation (addition reaction) curing type, the heat resistant silicone rubber composition of the present invention typically contains: (C) an organopolysiloxane that has at least two alkenyl groups in a molecule; (D) an organohydrogenpolysiloxane that has at least two silicon-bonded hydrogen atoms in a molecule; and (E) a hydrosilylation reaction catalyst.

The organopolysiloxane of the component (C) is the main component of the heat resistant silicone rubber composition and has at least two silicon-bonded alkenyl groups in a molecule. Examples of the alkenyl group include a vinyl group, an allyl group, and a propenyl group. Examples of organic groups other than the alkenyl group include alkyl groups such as a methyl group, an ethyl group, a propyl group, a butyl group, a pentyl group, a hexyl group, an octyl group, a decyl group, and a dodecyl group; aryl groups such as a phenyl group and a tolyl group; aralkyl groups such as a benzyl group and a β-phenylethyl group; and halogen-substituted alkyl groups such as a 3,3,3-trifluoropropyl group and a 3-chloropropyl group. The molecular structure of the component (C) may be any of straight, branched-straight, ring, and net-like, and two or more types of organohydrogenpolysiloxanes may be used in combination. No particular limitation is placed on the molecular weight of the component (C), and organopolysiloxanes may be used ranging from low viscosity liquid type organopolysiloxanes to highly viscous gum-like organopolysiloxanes. However, in order to produce a rubber-like elastic body by curing, the viscosity at 25° C. is preferably greater than or equal to 100 mPa·s.

The organohydrogenpolysiloxane (D) is a crosslinking agent for the heat resistant silicone rubber composition. In the presence of the hydrosilylation reaction catalyst (E), the organohydrogenpolysiloxane (D) crosslinks/cures the heat resistant silicone rubber composition by addition reacting the silicon-bonded hydrogen atom in the component (D) with the silicone-bonded alkenyl group in the component (C). The organohydrogenpolysiloxane of the component (D) has at least two silicon-bonded hydrogen atoms in a molecule. Examples of organic groups other than the silicon-bonded hydrogen atom include alkyl groups such as a methyl group, an ethyl group, and a propyl group; aryl groups such as a phenyl group and a tolyl group; and substituted alkyl groups such as a 3,3,3-trifluoropropyl group and a 3-chloropropyl group. The molecular structure of the component (D) may be any of straight, branched-straight, ring, and net-like, and two or more types of organohydrogenpolysiloxanes may be used in combination.

Although no particular limitation is placed on the molecular weight of the component (D), this molecular weight is preferably such that viscosity at 25° C. is in a range of 3 to 10,000 cP. The compounded amount of the component (D) is an amount such that the molar ratio of the silicon-bonded hydrogen atoms in the component (D) to the silicon-bonded alkenyl groups in the component (C) is from (0.5:1) to (20:1), and preferably from (1:1) to (3:1). This is because, relative to 1 mol of the silicon-bonded alkenyl groups in the component (C), when the number of moles of the silicon-bonded hydrogen atoms in the component (D) is less than 0.5, the silicone rubber composition is unable to sufficiently cure, and when the number of moles of the silicon-bonded hydrogen atoms in the component (D) is greater than 20, foaming may occur in the cured product.

The hydrosilylation reaction catalyst (E) is a catalyst for curing a hydrosilylation (addition reaction) curing type heat resistant silicone rubber composition. A conventionally known hydrosilylation reaction catalyst may be used as the hydrosilylation reaction catalyst of the component (E). Examples of the hydrosilylation reaction catalyst include chloroplatinic acid; alcohol solutions of chloroplatinic acid; complexes of chloroplatinic acid with olefins, vinylsiloxanes, or acetylene compounds; platinum black; platinum type catalysts such as catalysts supporting platinum on a solid surface; palladium type catalysts such as tetrakis (triphenylphosphine) palladium; and rhodium type catalysts such as chlorotris(triphenylphosphine) rhodium. Among such catalysts, platinum type catalysts are preferred. The compounded amount of the component (E) relative to one million parts by mass of the total of the component (C) and the component (D) is preferably from 0.1 to 500 parts by mass in terms of catalyst metal element basis. This is because the curing does not proceed sufficiently if this compounded amount is less than 0.1 parts by mass, and this is also because there is a concern that it would be uneconomical if this compounded amount exceeds 500 parts by mass.

The hydrosilylation (addition reaction) curing type heat resistant silicone rubber composition may also contain a curing retarder in order to adjust the curing rate and the workable time interval of the heat resistant silicone rubber composition. Examples of the curing retarder include alcohol derivatives having a carbon-carbon triple bond, such as 3-methyl-1-butyn-3-ol, 3,5-dimethyl-1-hexyn-3-ol, phenylbutynol, and 1-ethynyl-1-cyclohexanol; ene-yne compounds such as 3-methyl-3-penten-1-yne and 3,5-dimethyl-3-hexen-1-yne; alkenyl group-containing low molecular weight siloxanes such as tetramethyltetravinylcyclotetrasiloxane and tetramethyltetrahexenylcyclotetrasiloxane; and alkyne-containing silanes such as methyl-tris(3-methyl-1-butyn-3-oxy)silane and vinyl-tris(3-methyl-1-butyn-3-oxy)silane.

The compounded amount of the curing retarder may be selected appropriately according to the method of utilization of the hydrosilylation (addition reaction) curing type heat resistant silicone rubber composition, the molding method, or the like. Generally, the compounded amount of the curing retarder relative to the total mass of the hydrosilylation (addition reaction) curing type heat resistant silicone rubber composition is from 0.001% to 5 mass %.

In the case of condensation reaction curing type, the heat resistant silicone rubber composition of the present invention comprises, for example: (F) a diorganopolysiloxane that is liquid at ambient temperature and has molecular terminals capped with silanol groups or silicon-bonded hydrolyzable groups, or a partially hydrolyzed condensate of organosilane having a silicon-bonded hydrolyzable group; (G) an organosiloxane type crosslinking agent or organosilane type crosslinking agent having a sufficient amount of silicon-bonded hydrolyzable groups for crosslinking the component (F); and (H) a required amount of a condensation reaction promotion catalyst. The cured product thereof can be obtained by, for example, curing the composition at room temperature.

Examples of the silicon-bonded hydrolyzable group in the component (F) include ketoximo groups [also referred to as "ketoximino" groups, which are groups represented by the general formula: —O—N=$CR^2R^3$ (in the formula, $R^2$ and $R^3$ are the same or different alkyl groups, and an alkyl group having from 1 to 6 carbons is preferred)] such as a dimethylketoxymo group and a methylethylketoxymo group; alkoxy groups such as a methoxy group and an ethoxy group; acyloxy groups such as an acetoxy group; alkylamino groups such as an N-butylamino group and an N,N-diethylamino group; acylamido groups such as an N-methylacetoamido group; N,N-dialkylaminooxy groups such as an N,N-diethylaminooxy group; and alkenyloxy groups such as a propenoxy group. Among these, alkoxy groups and ketoximo groups are preferred.

Specific examples of the component (F) include dimethylpolysiloxanes capped at both molecular terminals with a silanol group, with a silicon-bonded methoxy group, or with a silicon-bonded ethoxy group; methylalkylpolysiloxanes; dimethylsiloxane-methylphenylsiloxane copolymers; methyl(3,3,3-trifluoropropyl)polysiloxane; partially hydrolyzed condensates of alkoxysilanes; or the like. From the perspectives of economics and properties of the cured product, the use of dimethylpolysiloxane or a partially hydrolyzed condensate of alkoxysilane is preferred. Furthermore, examples of the terminal group of the dimethylpolysiloxane capped with a silicon-bonded methoxy group or with a silicon-bonded ethoxy group include a methyldimethoxysiloxy group, a methyldiethoxysiloxy group, a trimethoxysiloxy group, a triethoxysiloxy group, a methyldimethoxysilylethyl(dimethyl)siloxy group, a trimethoxysilylethyl (dimethyl)siloxy group, or the like.

The component (F) may be used as a combination of two or more types of partially hydrolyzed condensate of organosilane or diorganopolysiloxane. For example, a mixture is cited that comprises: (F-1) a dimethylpolysiloxane capped at both molecular terminals by silanol groups and having a viscosity at 25° C. of 20 to 100 mPa·s, and (F-2) a dimethylpolysiloxane capped at both molecular terminals by silanol groups and having a viscosity at 25° C. of 1,000 to 5,000 mPa·s. Here, the compounding ratio of the component (F-1) to the component (F-2) is preferably in a range of 1/99 to 10/90, in terms of mass ratio.

The component (G), which is a crosslinking agent for the component (F), contains at least two, and preferably three or four, silicon-bonded hydrolyzable groups. Typically, this component is an organosilane represented by the general formula: $R^4ySiX_{4-y}$ (in the formula, $R^4$ is a monovalent hydrocarbon group having from 1 to 10 carbons; X is a silicon-bonded hydrolyzable group; and y is 0 or 1) or an organosiloxane oligomer which is a partially hydrolyzed condensate of the organosilane. The definitions and examples of the monovalent hydrocarbon group are as listed above. Examples of the silicon-bonded hydrolyzable group include ketoximo groups [also referred to as "ketoximino" groups, which are groups represented by the general formula: —O—N═$CR^5R^6$ (in the formula, R5 and R6 are the same or different alkyl groups, and an alkyl group having from 1 to 6 carbons is preferred)] such as a dimethylketoxymo group and a methylethylketoxymo group; alkoxy groups such as a methoxy group and an ethoxy group; acyloxy groups such as an acetoxy group; alkylamino groups such as an N-butylamino group and an N,N-diethylamino group; acylamido groups such as an N-methylacetoamido group; N,N-dialkylaminooxy groups such as an N,N-diethylaminooxy group; and alkenyloxy groups such as a propenoxy group. Among these, alkoxy groups and ketoximo groups are preferred.

Examples of the component (G) include tetramethoxysilane, tetraethoxysilane, n-propyl orthosilicate, methyltrimethoxysilane, methyltriethoxysilane, dimethyldimethoxysilane, dimethyldiethoxysilane, vinyltrimethoxysilane, vinyltris(2-methoxyethoxy)silane, 3-aminopropyltriethoxysilane, 3-glycidoxypropylmethyldimethoxysilane, bis-[3-(triethoxysilyl)-propyl]tetrasulfide, bis-[3-(triethoxysilyl)-propyl]disulfide, triethoxysilylpropyl-methacrylate-monosulfide, tetrakis(methylethylketoximo)silane, methyl-tris(methylethylketoximo)silane, vinyl-tris (methylethylketoximo)silane, methyltriacetoxysilane, ethyltriacetoxysilane, methyltriisopropenoxysilane, tetraisopropenoxy silane, and methyl-tri(N,N-diethylamino)silane.

The compounded amount of the component (G) is an amount sufficient for curing the component (F). If the heat resistant silicone rubber composition is a one-liquid type heat resistant silicone rubber composition, the compounded amount of the component (G) is an amount such that long-term storage is possible if the heat resistant silicone rubber composition is shielded from moisture, and so that curing is possible at ambient temperature upon contact with moisture. This compounded amount of the component (G) is normally in a range of 2 to 30 mass %. Specifically, the compounded amount of the component (G) per 100 parts by mass of the component (F), for example, is from 5 to 100 parts by mass, and a compounded amount in a range of 8 to 40 parts by mass is preferred from the perspective of curing ability.

Any conventionally known condensation reaction promotion catalyst may be used as the component (H). Specific examples of the component (H) include organic tin compounds such as dibutyltin diacetate, dibutyltin dioctate, dibutyltin dilaurate, dibutyltin dimaleate, dioctyltin dilaurate, dioctyltin dimaleate, and tin octylate; organic titanate compounds such as tetra(i-propyl) titanate, tetra(n-butyl) titanate, dibutoxybis(acetylacetonate) titanium, isopropyltriisostearoyl titanate, isopropyltris(dioctylpyrophosphate) titanate, and bis(dioctylpyrophosphate) oxyacetate titanate; organic zirconium compounds such as tetrabutyl zirconate, tetrakis(acetylacetonate) zirconium, tetraisobutyl zirconate, butoxytris(acetylacetonate) zirconium, and zirconium naphthenate; organic aluminum compounds such as tris(ethylacetoacetate) aluminum and tris(acetylacetonate) aluminum; metal salts of organic acids such as zinc naphthenate, cobalt naphthenate, and cobalt octylate; and amine type catalysts such as diethanolamine and triethanol amine. Furthermore, an organic tin compound or organic titanate compound may be used in a dealcoholization type condensation reaction curing type heat resistant silicone rubber composition, and an organic titanate compound may be used in a deoxime type condensation reaction curing type heat resistant silicone rubber composition.

The compounded amount of the component (H) is a sufficient amount to promote the condensation reaction between the component (F) and component (G). For example, the compounded amount of the component (H) is from 0.1 to 15 mass %, and preferably is from 1 to 8 mass %.

In the case of ultraviolet radiation-curing type, the heat resistant silicone rubber composition of the present invention contains, for example, hydrosilylation reaction curing type organopolysiloxane and a photoinitiator; acrylic functional polysiloxane and a photoinitiator; or epoxy-functional organopolysiloxane and a cation generating type catalyst. The cured product thereof can be obtained by, for example, irradiating the composition with ultraviolet light.

The photoinitiator may be a conventionally known compound that generates a free radical due to irradiation by ultraviolet radiation. The photoinitiator may be selected appropriately from organic peroxides, carbonyl compounds, organic sulfur compounds, azo compounds, and the like.

Moreover, the cation generating type catalyst is a known onium salt. Specifically, the onium salt can be selected appropriately from triaryl sulfonium salts, triaryl iodonium salts, bis(dodecylphenyl) hexafluoroantimonate, and the like.

The titanium oxide used in the present invention refers to titanium dioxide. Titanium oxide has three types of crystal forms, namely, anatase type (anatase), rutile type (rutile), and brookite type (brookite). Among these, anatase type and rutile type titanium oxides are used on an industrial scale, and anatase type and rutile type titanium oxides can be used also in the present invention.

Titanium oxides also have various specific surface areas. The specific surface area can be determined from the adsorbed quantity measured by adsorbing a molecule, which has an occupied adsorption area that is known in advance, on a surface of the titanium oxide particle at a temperature of liquid nitrogen. In particular, the specific surface area is generally determined by a BET method using a physical adsorption of an inert gas at a low temperature and low humidity. The BET specific surface area of titanium oxide used in the present invention is preferably 10 $m^2/g$ or greater, more preferably 15 $m^2/g$ or greater, and further preferably 30 $m^2/g$ or greater, while the BET specific surface area is preferably 500 $m^2/g$ or less, more preferably 300 $m^2/g$ or less, and further preferably 200 $m^2/g$ or less.

The particle shape of the iron oxide used in the present invention is not particularly limited, and the particle shape can be any of spherical, needle-like, rhombic, dice-shaped, and irregular shapes. Examples of the iron oxide include diiron trioxide (red iron oxide) and triiron tetraoxide (black iron oxide). In particular, diiron trioxide is preferable. Also, the iron oxide may be surface-treated iron oxide in which the surface is treated with a surface treatment agent exemplified by an organosilicon compound such as organoalkoxysilane, organosilazane, silanol, or an alkoxy group-containing organopolysiloxane. The particle diameter thereof is preferably 1 μm or less, more preferably 0.5 μm or less, and further preferably 0.1 μm or less.

The heat resistant silicone rubber composition of the present invention contains greater than or equal to 0.1 mass % each, preferably contains greater than or equal to 0.2 mass % each, and more preferably contains greater than or equal to 0.3 mass % each of titanium oxide and iron oxide, while the heat resistant silicone rubber composition preferably contains less than or equal to 10 mass % each of titanium oxide and iron oxide. In the heat resistant silicone rubber composition of the present invention, the ratio of titanium oxide to iron oxide is not particularly limited; however, the mass ratio is preferably in a range of 1:10 to 10:1.

Furthermore, preferably, each of the titanium oxide and iron oxide particles are premixed with organopolysiloxane so as to obtain a master batch, and the master batch is mixed with other components. Organopolysiloxane used to prepare this master batch is exemplified by the same organopolysiloxane as described above. In addition, when preparing the heat resistant silicone rubber composition of the present invention, a master batch of iron oxide is preferably mixed later.

As long as the effect of the present invention is not impaired, various types of other additives may be compounded in the heat resistant silicone rubber composition of the present invention, as exemplified by reinforcing fillers other than silica fine powders such as fumed titanium oxide; non-reinforcing fillers such as ground quartz, crystalline silica, diatomaceous earth, asbestos, aluminosilicates, zinc oxide, and calcium carbonate; and such fillers having undergone surface treatment using an organosilicon compound such as organosilane and organopolysiloxane. In addition, the heat resistant silicone rubber composition may, if necessary, contain additives such as pigments, flame retardants, internal release agents, plasticizers, and non-functional silicone oils.

The heat resistant silicone rubber composition of the present invention can be easily produced by homogeneously mixing a composition that contains the above-mentioned components and, if necessary, a variety of additives using a publicly known kneading means such as a Ross mixer, a two roll mill or a kneader mixer.

The second aspect of the present invention is a cured product of the heat resistant silicone rubber composition described above. The cured product of the present invention is provided with a high heat resistance, and generates less formaldehyde and/or low molecular weight organopolysiloxane in a high temperature environment, such as in a temperature greater than or equal to 300° C. Therefore, the cured product can be suitably used for applications such as applications where effects of harmful substances on the human body should be avoided, and/or applications where a clean environment is required.

The third aspect of the present invention is a method of reducing formaldehyde and/or low molecular weight organopolysiloxane generated from a cured product of a silicone rubber composition upon heating the cured product, the method comprising compounding greater than or equal to 0.1 mass % each of titanium oxide and iron oxide in the composition. By this method, even when the cured product is heated to a high temperature, such as a temperature greater than or equal to 300° C., generation of formaldehyde and/or low molecular weight organopolysiloxane from the cured product can be reduced.

Furthermore, the fourth aspect of the present invention is a use of greater than or equal to 0.1 mass % each of titanium oxide and iron oxide in a silicone rubber composition for reducing the amount of formaldehyde and/or low molecular weight organopolysiloxane generated from a cured product of the composition upon heating the cured product. By this method, even when the cured product is heated to a high temperature, such as a temperature greater than or equal to 300° C., generation of formaldehyde and/or low molecular weight organopolysiloxane from the cured product can be reduced.

INDUSTRIAL APPLICABILITY

The silicone rubber obtained by curing the heat resistant silicone rubber composition of the present invention has a characteristic that the amount of formaldehyde and/or low molecular weight organopolysiloxane in a gas generated therefrom is low even when exposed to an extremely high temperature, such as 300° C. or higher. Therefore, electrical contact failure due to low molecular weight organopolysiloxane can be controlled, and the silicone rubber can be suitable as silicone rubber that can be used in the proximity of an electrical contact. Since the generation of formaldehyde is also low, the silicone rubber is suitable as silicone rubber with a low impact on the environment. Specifically, the silicone rubber is suitable for use as cookware used under high temperature conditions, or as an adhesive, a sealing/packing, or the like in a high temperature part such as an oven, a heating furnace, an engine compartment of an automobile, or the like. In addition, because the silicone rubber has a low compression set, the silicone rubber is particularly suitable in use as a packing, a sealing, and the like.

EXAMPLES

Hereinafter, the present invention is described in detail with reference to Practical Examples and Comparative Examples, but it should be understood that the present invention is not limited to these Practical Examples.

[Practical Examples 1 to 5 and Comparative Examples 1 to 6: Peroxide Curing Type Silicone Rubber Composition]

(Raw Materials Used for Preparing the Peroxide Curing Type Silicone Rubber Compositions of Practical Examples 1 to 5 and Comparative Examples 1 to 6)

(1) Silicone Rubber Base Compound 100 parts by mass of a copolymer raw rubber of dimethylsiloxane-methylsiloxane capped at both molecular terminals with vinyldimethylsiloxy groups (vinyl group content: 0.097 mass %; weight average molecular weight: about 700,000), 37 parts by mass of dry-process silica fine powder (BET specific surface area: 300 mm$^2$/g), and 12 parts by mass of dimethylsiloxane oligomer capped at both molecular terminals with silanol groups (kinetic viscosity: 40 mm$^2$/s, as a plasticizer) were loaded into a kneader-mixer, and the mixture was kneaded uniformly. Thereafter, the mixture was kneaded for 90 minutes at 175° C. to prepare the silicone rubber base compound.

(2) Curing Agent A

A mixture of silica and a silicone oil containing 50 mass % of 2,5-dimethyl-2,5-di-(t-butylperoxy)hexane was used.

(3) Iron Oxide Master Batch 50 parts by mass of diiron trioxide (particle diameter: 0.09 μm) and 50 parts by mass of a copolymer raw rubber of dimethylsiloxane-methylvinylsiloxane capped at both molecular terminals with dimethylvinylsiloxane groups (degree of polymerization: 6,000) and composed of 99.8 mol % dimethylsiloxane units and 0.13 mol % methylvinylsiloxane units were mixed using two rolls to prepare the master batch.

(4) Titanium Oxide Master Batch A 46 parts by mass of titanium oxide A (manufactured by Nippon Aerosil Co., Ltd.; trade name: P-25; BET specific surface area: 50 m$^2$/g; anatase type crystal: 80%), and 54 parts by mass of a copolymer raw rubber of dimethylsiloxane-methylvinylsiloxane capped at both molecular terminals with dimethylvinylsiloxane groups (degree of polymerization: 6,000) and composed of 99.8 mol % dimethylsiloxane units and 0.13 mol % methylvinylsiloxane units were mixed using two rolls to prepare the master batch.

(5) Titanium Oxide Master Batch B 50 parts by mass of titanium oxide B (manufactured by Ishihara Sangyo Kaisha Ltd.; product name: Tipaque R630; BET specific surface area: 15 m$^2$/g; anatase type crystal: 0%), and 50 parts by mass of a copolymer raw rubber of dimethylsiloxane-methylvinylsiloxane capped at both molecular terminals with dimethylvinylsiloxane groups (degree of polymerization: 6,000) and composed of 99.8 mol % dimethylsiloxane units and 0.13 mol % methylvinylsiloxane units were mixed using two rolls to prepare the master batch.

(6) Titanium Oxide Master Batch C

The titanium oxide master batch C was prepared in the same manner as the titanium oxide master batch B except for using a titanium oxide C (manufactured by Ishihara Sangyo Kaisha Ltd.; product name: Tipaque A-100; BET specific surface area: 11 m$^2$/g; anatase type crystal: 100%) in place of titanium oxide B.

(7) Carbon Black Master Batch 35 parts by mass of acetylene black (manufactured by Denki Kagaku Kogyo K.K.; trade name: Denka Black), and 65 parts by mass of a copolymer raw rubber of dimethylsiloxane-methylvinylsiloxane capped at both molecular terminals with dimethylvinylsiloxane groups (degree of polymerization: 6,000) and composed of 99.8 mol % dimethylsiloxane units and 0.13 mol % methylvinylsiloxane units were mixed using two rolls to prepare the master batch.

(8) Cerium Oxide Master Batch 43 parts by mass of cerium oxide powder (manufactured by Nikki K.K.; trade name: highly pure cerium oxide) and 57 parts by mass of a copolymer raw rubber of dimethylsiloxane-methylvinylsiloxane capped at both molecular terminals with dimethylvinylsiloxane groups (degree of polymerization: 6,000) and composed of 99.8 mol % dimethylsiloxane units and 0.13 mol % methylvinylsiloxane units were mixed using two rolls to prepare the master batch.

(Preparation of Test Pieces of the Silicone Rubbers of Practical Examples 1 to 5 and Comparative Examples 1 to 6)

(1) Preparation of Test Pieces of the Silicone Rubbers of Practical Examples 1 to 5

Heat resistant silicone rubber compositions were prepared, using the compounding ratios described in Table 1 below, by uniformly mixing the silicone rubber base compound, the curing agent A, and any one of the master batches A to C containing titanium oxide using a two roll mill, and then mixing the master batch containing iron oxide.

Here, greater than or equal to 0.1 mass % each of titanium oxide and iron oxide are contained. Thereafter, these compositions were press-vulcanized for 10 minutes at 170° C., and then oven-vulcanized for 4 hours at 200° C. Test pieces having a thickness of 2 mm of the silicone rubbers of Practical Examples 1 to 5 were obtained.

(2) Preparation of a Test Piece of The Silicone Rubber of Comparative Example 1

A test piece of the silicone rubber of Comparative Example 1 was obtained by the same method as in Practical Examples 1 to 5 except for using no master batch containing iron oxide and no master batch containing titanium oxide.

(3) Preparation of a Test Piece of the Silicone Rubber of Comparative Example 2

A test piece of the silicone rubber of Comparative Example 2 was obtained by the same method as in Practical Examples 1 to 5 except that the content of titanium oxide and iron oxide were both 0.05 mass %.

(4) Preparation of Test Pieces of the Silicone Rubbers of Comparative Examples 3 to 6

Test pieces of the silicone rubbers of Comparative Examples 3 to 6 were obtained by the same method as in Practical Examples 1 to 5 except for using only any one type of cerium oxide, iron oxide, titanium oxide, and carbon black in place of the combination of titanium oxide and iron oxide.

(Evaluation and Analysis Method of the Test Pieces of the Silicone Rubbers)

(1) Collection of Generated Gas

Water-soluble formaldehyde was collected by placing 1 g of each of the test pieces of the silicone rubbers in a tube furnace, heating for 1 hour at 300° C., and leading generated gas to an absorbing liquid (ultrapure water). Low molecular weight siloxane was collected by further leading the gas to a solvent desorption tube for absorbing the low molecular weight siloxane.

(2) Quantification of Low Molecular Weight Siloxane

The absorber in the solvent desorption tube was added to 2 mL of carbon disulfide, and shaken for 1 hour or longer, then the measurement was made by gas chromatography. Quantification was performed by adding 1 μL, 2 μL, or 3 μL of each of octamethyl cyclotetrasiloxane (D4), decamethyl cyclopentasiloxane (D5), or dodecamethyl cyclohexasiloxane (D6) into 2 mL of carbon disulfide, carring out the measurement under the same conditions, and plotting a calibration curve.

(3) Quantification of Formaldehyde

A: Acetylacetone Solution 15 g of ammonium acetate was dissolved using about 100 mL of ultrapure water in a 200 mL beaker, and the solution was transferred into a 200 mL volumetric flask. Thereafter, 0.2 mL of acetylacetone and 0.3 mL of acetic acid were added, and ultrapure water was further added to make a 200 mL solution.

B: Formaldehyde Solution for Calibration Curve

5 μL of formaldehyde standard stock solution (1 mg/1 mL methanol), 20 g of ultrapure water, and 5 mL of acetylacetone solution were placed in a 30 mL glass vial, and then heated for 1 hour at 60° C., and used as a sample for calibration curve.

C: Preparation of Measurement Sample

Ultrapure water was added to 0.5 g of absorbing liquid in which formaldehyde was collected to make a 20 g solution, and then 5 mL of acetylacetone solution was added. Then, the solution was heated in an oven for 1 hour at 60° C. and used as a measurement sample. Meanwhile, a solution in which 5 mL of acetylacetone solution was added to 20 g of ultrapure water, and heated for 1 hour at 60° C. was used as a blank.

D: Absorbance Measurement

The base line correction was performed by using the blank, and the absorbances of the samples for the calibration curve, and the measurement samples were measured in a range of 360 to 500 nm. Using the calibration curve made from measured values of the sample in which formaldehyde standard was added, the content of formaldehyde was determined.

(Measurement Results of the Contents of Formaldehyde and Low Molecular Weight Organopolysiloxane Generated from the Silicone Rubbers)

The raw materials and the compounded amounts for the silicone rubber compositions of Practical Examples 1 to 5 and Comparative Examples 1 to 6, and the contents of formaldehyde and low molecular weight organopolysiloxane (D4, D5, and D6) in a gas generated upon treating at 300° C. are shown in Table 1 below. In the table, the proportion of titanium oxide and the proportion of iron oxide represent the proportions contained in a test piece, and the unit is in mass %. On the other hand, the contents of the raw materials, such as the silicone rubber base compound, are in mass parts.

TABLE 1

| | Practical Examples | | | | | Comparative Examples | | | | | |
|---|---|---|---|---|---|---|---|---|---|---|---|
| | 1 | 2 | 3 | 4 | 5 | 1 | 2 | 3 | 4 | 5 | 6 |
| Silicone rubber base compound (part by mass) | 100 | 100 | 100 | 100 | 100 | 100 | 100 | 100 | 100 | 100 | 100 |
| Curing agent A (part by mass) | 0.6 | 0.6 | 0.6 | 0.6 | 0.6 | 0.6 | 0.6 | 0.6 | 0.6 | 0.6 | 0.6 |
| Iron oxide master batch (part by mass) | 1 | 2 | 0.5 | 1 | 1 | | 0.1 | | 2 | | |
| Titanium oxide master batch A (part by mass) | 1 | 2 | 0.5 | | | | 0.1 | | | 2 | |
| Titanium oxide master batch B (part by mass) | | | | 1 | | | | | | | |
| Titanium oxide master batch C (part by mass) | | | | | 1 | | | | | | |
| Carbon black master batch (part by mass) | | | | | | | | | | | 2 |
| Cerium oxide master batch (part by mass) | | | | | | | | 2 | | | |
| Formaldehyde content (ppm) | 226 | 216 | 402 | 358 | 286 | 15197 | 9731 | 8148 | 376 | 632 | 421 |
| D4 content (ppm) | 369 | 512 | 483 | 599 | 421 | 2210 | 909 | 1811 | 784 | 682 | 916 |
| D5 content (ppm) | 84 | 154 | 115 | 137 | 98 | 483 | 182 | 387 | 197 | 163 | 235 |

TABLE 1-continued

| | Practical Examples | | | | | Comparative Examples | | | | | |
|---|---|---|---|---|---|---|---|---|---|---|---|
| | 1 | 2 | 3 | 4 | 5 | 1 | 2 | 3 | 4 | 5 | 6 |
| D6 content (ppm) | 15 | 116 | 23 | 28 | 21 | 89 | 31 | 66 | 43 | 25 | 54 |
| Total content of D4 to D6 (ppm) | 468 | 782 | 621 | 764 | 540 | 2782 | 1122 | 2264 | 1024 | 870 | 1205 |
| Iron oxide proportion (mass %) | 0.49 | 0.96 | 0.25 | 0.49 | 0.49 | 0.00 | 0.05 | 0.00 | 0.97 | 0.00 | 0.00 |
| Titanium oxide proportion (mass %) | 0.45 | 0.88 | 0.23 | 0.49 | 0.49 | 0.00 | 0.05 | 0.00 | 0.00 | 0.90 | 0.00 |

By comparing Practical Examples 1 to 5 to Comparative Examples 1 and 2, it was clear that the gas generated from the silicone rubbers of Practical Examples 1 to 5 at 300° C. contained significantly lower content of formaldehyde and low molecular weight organopolysiloxane compared to the case where the silicone rubber did not contain titanium oxide and iron oxide (Comparative Example 1) or to the case where the silicone rubber contained only 0.05 mass % each of titanium oxide and iron oxide (Comparative Example 2).

In addition, by comparing Practical Examples 1, 4, and 5 to Comparative Examples 3 to 6, in which the content of additives such as iron oxide are substantially the same, it was clear that the gas generated from the silicone rubbers of Practical Examples 1, 4, and 5 at 300° C. contained significantly lower content of formaldehyde and low molecular weight organopolysiloxane compared to the case where cerium oxide which is a known heat resistant agent was used (Comparative Example 3), to the case where only iron oxide was used (Comparative Example 4), to the case where only titanium oxide was used (Comparative Example 5), or to the case where carbon black which is a known heat resistant agent was used (Comparative Example 6).

(Measurement Results of Compression Set of the Silicone Rubbers of Practical Examples 1 to 4)

The compression set of the silicone rubbers of the present invention (Practical Examples 1 to 4) was measured and compared with the case where titanium oxide and iron oxide were not contained (Comparative Example 1). Here, measurement of the compression set was performed according to the method stipulated by JISK6262-1997, “Rubber, vulcanized or thermoplastic—Determination of compression set,” using the following test conditions: compression rate: 25%; testing temperature: 180° C.; and testing time: 22 hours. The measurement results are shown below.

TABLE 2

| | Practical Examples | | | | Comparative |
|---|---|---|---|---|---|
| | 1 | 2 | 3 | 4 | Example 1 |
| Silicone rubber base compound (part by mass) | 100 | 100 | 100 | 100 | 100 |
| Curing agent A (part by mass) | 0.6 | 0.6 | 0.6 | 0.6 | 0.6 |
| Iron oxide master batch (part by mass) | 1 | 2 | 0.5 | 1 | |
| Titanium oxide master batch A (part by mass) | 1 | 2 | 0.5 | | |
| Titanium oxide master batch B (part by mass) | | | | 1 | |
| Compression set (%) | 19 | 16 | 22 | 24 | 34 |

The compression sets of the silicone rubbers of the present invention (Practical Examples 1 to 4) were significantly lowered compared to the case where titanium oxide and iron oxide were not contained (Comparative Example 1).

[Practical Example 6 and Comparative Example 7: Hydrosilylation Curing Type Silicone Rubber Composition]

(Raw Materials Used for Preparing Hydrosilylation Curing Type Silicone Rubber)

The silicone rubber base compound used in Practical Examples 1 to 5 and Comparative Examples 1 to 6 and the following curing catalyst and the like were used.

(1) Curing Catalyst

A 1,3-divinyltetramethyldisiloxane solution of a platinum complex of 1,3-divinyl-1,1,3,3-tetramethyldisiloxane (platinum metal content =about 4,000 ppm) was used.

(2) Curing Retarder 1-ethynyl-1-cyclohexanol was used.

(3) Curing Agent B

A dimethylsiloxane-methylhydrogensiloxane copolymer capped at both molecular terminals with trimethylsiloxy groups (dynamic viscosity: 15 $mm^2/s$; silicon-bonded hydrogen atom content: about 0.8 mass %) was used.

(Preparation of Test Pieces of the Silicone Rubbers Of Practical Example 6 and Comparative Example 7)

(1) Preparation of a Test Piece of the Silicone Rubber of Practical Example 6

Hydrosilylation curing type heat resistant silicone rubber composition was prepared, using the compounding ratio described in Table 3 below, by uniformly mixing the silicone rubber base compound, the curing catalyst, the curing retarder, the curing agent B, and the master batch containing titanium oxide using a two roll mill, and then uniformly mixing the master batch containing iron oxide. The composition was press-vulcanized for 10 minutes at 120° C., and then oven-vulcanized for 4 hours at 200° C. A test piece having a thickness of 2 mm of the silicone rubber of Practical Example 6 was obtained.

(2) Preparation of a Test Piece of the Silicone Rubber of Comparative Example 7

A test piece of the silicone rubber of Comparative Example 7 was obtained by the same method as in Practical Example 6 except for using no master batch containing iron oxide and no master batch containing titanium oxide.

(Measurement Results of the Contents of Formaldehyde and Low Molecular Weight Organopolysiloxane Generated from the Silicone Rubbers and the Compression Set)

Measurement was performed by the same method as that of Practical Examples 1 to 5 and Comparative Examples 1 to 6.

The raw materials and the compounded amounts for the silicone rubber compositions of Practical Example 6 and Comparative Example 7, and the contents of formaldehyde and low molecular weight organopolysiloxane (D4, D5, and D6) in a gas generated upon treating at 300° C., and the compression sets are shown in Table 3 below. In the table, the contents of the raw materials, such as the silicone rubber base compound, are in mass parts.

TABLE 3

| | Practical Example 6 | Comparative Example 7 |
|---|---|---|
| Silicone rubber base compound (part by mass) | 100 | 100 |
| Curing catalyst (part by mass) | 0.024 | 0.024 |
| Curing retarder (part by mass) | 0.025 | 0.025 |
| Curing agent B (part by mass) | 0.83 | 0.83 |
| Iron oxide master batch (part by mass) | 1 | |
| Titanium oxide master batch A (part by mass) | 1 | |
| Formaldehyde content (ppm) | 223 | 11525 |
| D4 content (ppm) | 452 | 1289 |
| D5 content (ppm) | 110 | 263 |
| D6 content (ppm) | 24 | 56 |
| Total content of D4 to D6 (ppm) | 586 | 1608 |
| Compression set (%) | 34 | 39 |

The silicone rubber of the present invention (Practical Example 6) showed not only a significantly lower content of formaldehyde and low molecular weight organopolysiloxane contained in the gas generated at 300° C., but also a significantly lower compression set compared to the case where titanium oxide and iron oxide were not contained (Comparative Example 7).

The invention claimed is:

1. A method of reducing the amount of a gas comprising low molecular weight organopolysiloxane, and optionally formaldehyde, generated from a cured product of a heat resistant silicone rubber composition upon heating the cured product, the method comprising:

compounding 0.1 to 1 mass % each of titanium oxide and red iron oxide ($\alpha$-$Fe_2O_3$) in the heat resistant silicone rubber composition;

wherein the cured product of the heat resistant silicone rubber composition comprises the low molecular weight organopolysiloxane; and wherein the low molecular weight organopolysiloxane comprises D4 (octamethylcyclotetrasiloxane), D5 (decamethylcyclopentasiloxane), D6 (dodecamethylcyclohexasiloxane), or combinations thereof.

2. The method according to claim 1, wherein the mass ratio of compounded amounts of the titanium oxide to the red iron oxide is from 1:10 to 10:1.

3. The method according to claim 2, wherein the mass ratio of compounded amounts of the titanium oxide to the red iron oxide is 1:1.

4. The method according to claim 2, wherein 0.2 to 1 mass % each of titanium oxide and red iron oxide are compounded in the heat resistant silicone rubber composition.

5. The method according to claim 4, wherein 0.5 to 1 mass % each of titanium oxide and red iron oxide are compounded in the heat resistant silicone rubber composition.

6. The method according to claim 5, wherein the mass ratio of compounded amounts of the titanium oxide to the red iron oxide is 1:1.

7. The method according to claim 1, wherein 0.2 to 1 mass % each of titanium oxide and red iron oxide are compounded in the heat resistant silicone rubber composition.

8. The method according to claim 7, wherein 0.5 to 1 mass % each of titanium oxide and red iron oxide are compounded in the heat resistant silicone rubber composition.

9. The method according to claim 1, wherein the red iron oxide has a particle diameter of 1 μm or less.

10. The method according to claim 1, wherein the BET specific surface area of the titanium oxide is greater than or equal to 10 $m^2/g$.

11. The method according to claim 10, wherein the BET specific surface area of the titanium oxide is less than or equal to 500 $m^2/g$.

12. The method according to claim 1, wherein the heat resistant silicone rubber composition cures via peroxide cure.

13. The method according to claim 12, wherein the heat resistant silicone rubber composition comprises organopolysiloxane raw rubber and organic peroxide.

14. The method according to claim 1, wherein the gas generated from heating the cured product of the heat resistant silicone rubber composition comprises the low molecular weight organopolysiloxane and formaldehyde.

15. The method according to claim 1, wherein the heat resistant silicone rubber composition cures via hydrosilylation cure.

16. A heat resistant silicone rubber formed by curing the heat resistant silicone composition formed according to claim 1.

17. The heat resistant silicone rubber according to claim 16, wherein the heat resistant silicone rubber is a heat cooking vessel or a packing/sealing.

* * * * *